United States Patent [19]

Asai et al.

[11] 4,244,654

[45] Jan. 13, 1981

[54] COLOR DETECTING DEVICE FOR COLOR PRINTER

[75] Inventors: Eiichi Asai; Kazuo Shiota; Taizo Akimoto, all of Minami-ashigara, Japan

[73] Assignee: Fuji Photo Film Co., Ltd., Minami-ashigara, Japan

[21] Appl. No.: 908,451

[22] Filed: May 22, 1978

[30] Foreign Application Priority Data

May 25, 1977 [JP] Japan .................................. 52/60831

[51] Int. Cl.² ......................... G01J 3/46; G03B 27/78
[52] U.S. Cl. ....................................... 356/404; 354/38
[58] Field of Search ........................... 356/404; 355/38

[56] References Cited

U.S. PATENT DOCUMENTS

| | | | |
|---|---|---|---|
| 3,653,759 | 4/1972 | Klein | 356/404 |
| 4,120,581 | 10/1978 | Takahashi et al. | 355/38 |

*Primary Examiner*—Vincent P. McGraw
*Attorney, Agent, or Firm*—Gerald J. Ferguson, Jr.; Joseph J. Baker

[57] ABSTRACT

Red, green and blue densities of a color negative are measured at a plurality of points thereon. The measured densities are normalized by a normalizing circuit so that the same levels of density signals can be obtained regardless of the gamma value and sensitivity of the negatives when the same subject matter is photographed under the same conditions. The normalized density signals are plotted in a chromaticity coordinate system and examined as to whether or not they fall within a given region defining a polygon in the coordinate system. The coordinate system is a two dimensional coordinate system in which the axes thereof represent the combinations of two color densities among red, green and blue densities. When the level of the normalized signals with respect to a given point falls within the given region defined by the polygon, the point is determined to have the particular color.

9 Claims, 6 Drawing Figures

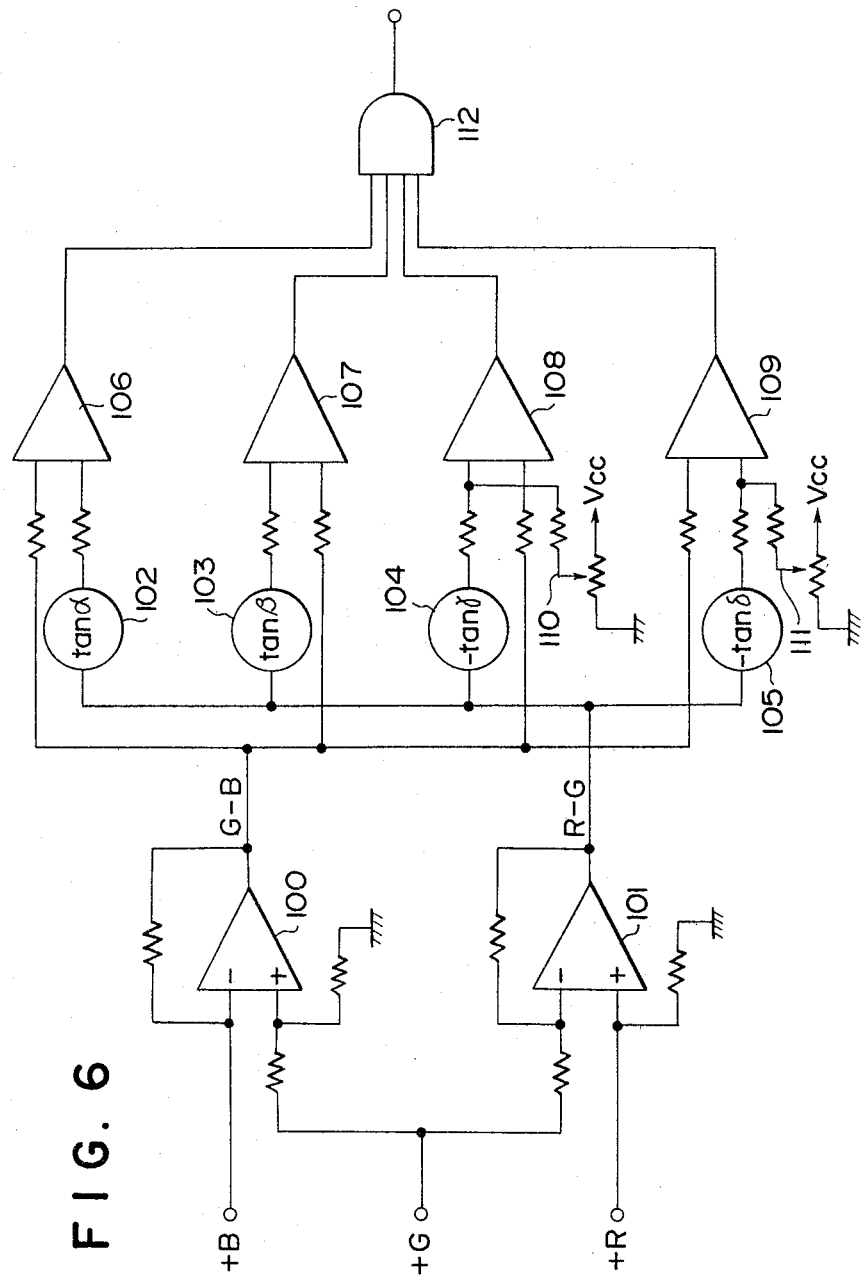

COLOR DETECTING DEVICE FOR COLOR PRINTER

BACKGROUND OF THE INVENTION

1. Field of the Invention

This invention relates to a device for detecting a particular color in color negatives or originals, and more particularly to a device for determining whether or not a particular color especially desired to be reproduced in a good condition such as flesh color is included in color negatives or originals.

2. Description of the Prior Art

It is generally desirable to be able to obtain color prints of proper color balance and density even from color negatives or originals having undesirable color balance and density. At the same time, since, depending on the subject matter of the photograph, most observers are concerned about a particular color as flesh color, green of green grass or blue of sky or water, it is often desirable that one of these colors be reproduced in particularly good condition. In other words, color prints in which such particular colors are not reproduced in good condition are apt to be regarded as unsatisfactory prints. According to an investigation conducted by the inventors, about 80% of the time the principal subject matter of color negatives is the human figure. Therefore, it is especially desirable that flesh color be reproduced in a good condition.

As is well known in the art, color prints of high quality, i.e., color prints of proper color balance and density, can be obtained even from color negatives of undesirable color balance and density by controlling the exposure in a photographic color printer.

In determining exposure in color printers, various methods have been known and practically employed. A well-known printing system in which the printing light source intensity is adjusted during red, green and blue exposures to levels which will normalize the resulting integrated transmittances to a near-neutral color balance, i.e., "gray", is based on U.S. Pat. No. 2,571,697, Evans. This printing system produces satisfactory results from a large majority of the negatives of a given type of film. It has also been known in the art to adjust the rate of correction for red, green and blue exposures based on a linear combination of the red, green and blue large area transmission densities (LATD) of the original to be printed.

Since the above described conventional printing systems are based on integrated transmission measurements conducted over the whole area of the original, the obtained prints are not always satisfactory. For instance, if the background of the principal subject matter is primarily red (red curtain or furniture), green (green grass or foliage) or blue (blue sky or water), color correction based only on the aforesaid LATD system is unsatisfactory. This problem is known as "color failure".

Further, if the background of the principal subject matter is of particularly high or low brightness, the conventional correction based on the integrated transmission density does not give satisfactory results. For example, when the principal subject matter has been photographed with a back light or in a spotlight conventional correction will give unsatisfactory results. This is known as "density failure".

According to the inventors' tests, in the color printing process using the LATD printing system the yield of satisfactory prints is about 70% of all the prints obtained.

It has also been known in the prior art to determine the exposure in a color printer based on the measured densities of divided areas of color originals in which the entire area of the original is divided into upper and lower, right and left, and central and peripheral sections. The exposure is determined based on a combination of the LATD and the densities of the divided areas. In this system, the yield of satisfactory prints is somewhat raised. However, since the density of the principal subject matter is not accurately measured in this system, the correction is not always effected in the most desirable manner.

In order to solve the above described problems in a photographic color printing process, there has been proposed a novel method of color printing in which the color negatives are printed based on a predetermined particular color when the color negatives have a predetermined particular color as the principal subject matter and the color negatives or originals are printed according to the conventional LATD printing system or the like when their principal subject matter does not have the particular color (U.S. Patent Applications Ser. Nos. 808,903 and 817,059).

In this method, the red, green and blue densities of a color negative are measured at a number of points thereon. A point is determined to have the predetermined particular color when the measured values of red, green and blue densities fall within a predetermined region in a chromaticity coordinate system when plotted therein. Thus, the particular color is defined by a particular region in the chromaticity coordinate system, which may be a three-dimensional system or a two-dimensional system the axes of which represent the red, green and blue densities or combinations of the three color densities.

When the negative has more than a certain number of points of the particular color, it is determined that its principal subject matter has the particular color and that the negative is to be printed based on the particular color.

It has been found that the yield of satisfactory color prints can be substantially raised in accordance with this method. However, in this method there is a problem that errors in determination of the color of the individual points may occur in some types of color negatives when various types of color negatives having different gamma values and sensitivities are used, since the densities vary depending on the gamma value and sensitivity of the film even if the same subject matter is photographed under the same conditions.

SUMMARY OF THE INVENTION

Accordingly, the primary object of the present invention is to provide a device, usable with various types of negatives, for detecting a particular color in color negatives or originals which can accurately determine whether or not the particular color is included in the color negatives or originals.

In accordance with the present invention, red, green and blue densities of a number of points on a negative are measured and the measured densities thereof are compared with a predetermined set of densities which define a particular color. The particular color is defined by a polygon in a two dimensional coordinate the axes of which represent combinations of red, green and blue densities. In order to determine whether or not the measured point falls within the predetermined region in the two dimensional chromatic coordinate system, the three color densities of the point are compared with predetermined values which define the polygon. Therefore, the color identifying means in the color detecting device in accordance with the present invention is provided with a plurality of comparators. The results obtained by the comparators are set to an AND circuit to examine all the results measured. In order to conduct the operation quickly, it is preferred to process the signals in an analogue mode.

It is known by experience that the principal subject matter occupies comparatively large area in the central portion of a picture. Therefore, when the number of the measured points which are determined to be of the particular color exceeds a predetermined number, the subject matter having that particuar color should be determined as the principal subject matter. Therefore, the number of the measured points determined to have the particular color is counted by a counter.

On the other hand, the results of the measurement and the red, green and blue densities of the measured points are memorized by a memorizing means. When the number of the measured points determined to have the particular color is larger than a predetermined number, the red, green and blue densities of the measured points are memorized by the memorizing means, and the average value of the densities is calculated in a digital mode. The average values of the red, green and blue densities are put into a color printer and the exposure of the color printer is controlled to print color pictures in the desirable color balance and density to obtain the desirable color balance and density of the particular color. Thus, the principal subject matter in the picture is printed on a color paper in the desirable color balance and density.

BRIEF DESCRIPTION OF THE DRAWING

FIG. 6 is a circuit diagram of still another example of the color identifying circuit which can be used when the particular color is defined by a trapezoid.

DESCRIPTION OF THE PREFERRED EMBODIMENT

A particular color can ordinarily be defined by use of an ellipse in a two dimensional coordinate system the two axes of which represent combinations of the three color densities, e.g. one of the axes represents the density difference between the green and blue densities (G-B) and the other represents the density difference between red and green densities (R-G). In order to simplify the calculation process, flesh color may be defined by use of a triangle or a trapezoid.

Figure 1:
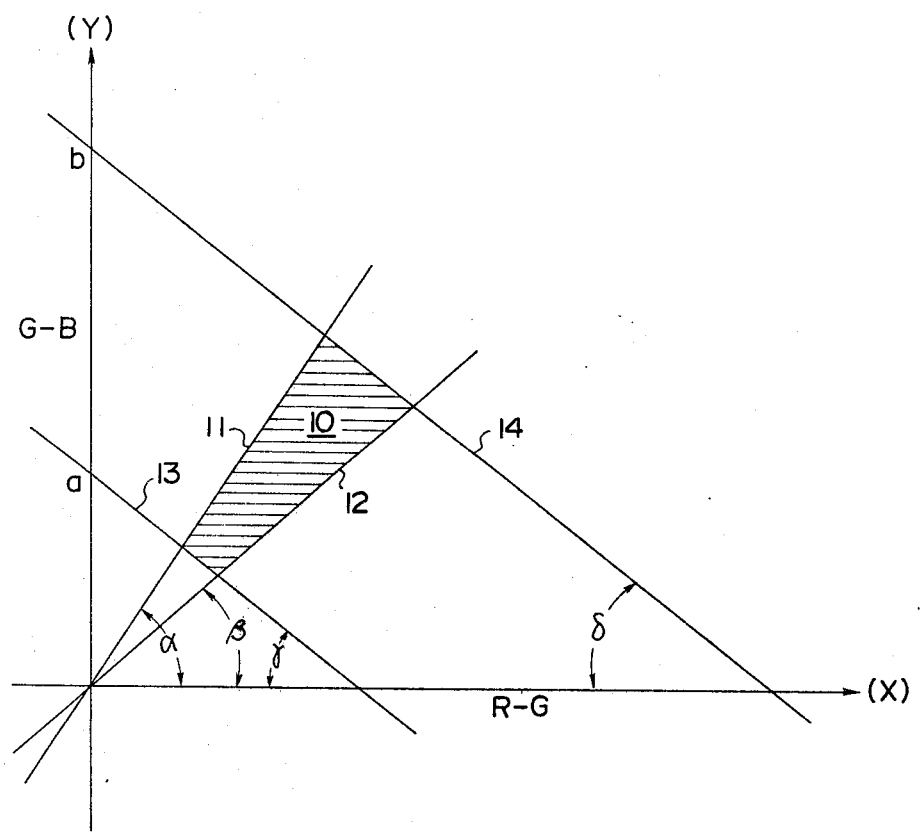
FIG. 1 shows a trapezoid in which defines flesh color a two-dimensional coordinate system the axes of which respectively represent the density differences between green and blue densities, and between red and green densities.

FIG. 1 shows an example in which flesh color is defined by use of a trapezoid 10 in a two-dimensional coordinate system the Y and X axes of which represent the density difference between green and blue densities (G-B) and the density difference between red and green densities (R-G), respectively. Four lines 11 to 14 including each edge of the trapezoid 10 are represented by the following formulae.

| line 11 | $Y = \tan \alpha \cdot X$ |
| --- | --- |
| line 12 | $Y = \tan \beta \cdot X$ |
| line 13 | $Y = -\tan \gamma \cdot X + a$ |
| line 14 | $Y = -\tan \delta \cdot X + b$ |

Accordingly, when the red, green and blue densities of a point, or the differences between the green and blue densities (Y) and between the red and green densities (X) satisfy the following inequalities, the point is determined to have flesh color.

$$Y \leq \tan \alpha \cdot X \tag{1}$$

$$Y \geq \tan \beta \cdot X \tag{2}$$

$$Y \geq (-\tan \gamma) \cdot X + a \tag{3}$$

$$Y \leq (-\tan \delta) \cdot X + b \tag{4}$$

In case that flesh color is defined by an ellipsoid represented by the formula (1), a point is determined to have flesh color when its red, green and blue densities are of such values that make $dS^2$ not larger than a predetermined constant K, e.g., 7.81.

Colors other than flesh color can also be defined by use of regions in a chromaticity coordinate system in a similar manner. Whether or not the measured densities of a point fall within the defined area is determined through calculation as will be described hereinbelow.

Figure 2:
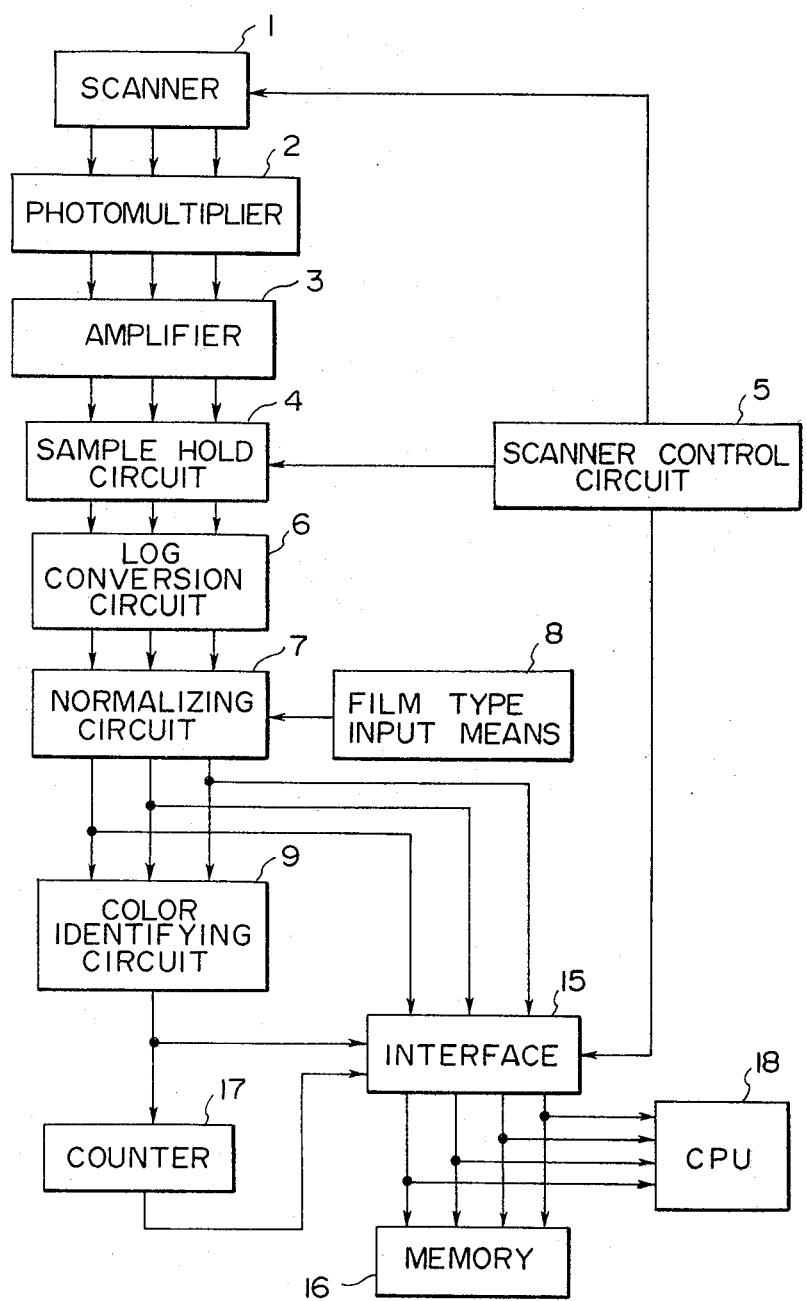
FIG. 2 is a block diagram illustrating an example of an exposure control system for a color printer using a color detecting device for detecting a particular color in accordance with an embodiment of this invention.

FIG. 2 is a block diagram for illustrating an example of an exposure control system for a color printer using a color detecting device for detecting a particular color in accordance with an embodiment of this invention.

A color negative is scanned by a scanner 1 and the light passing through the color negative (or the light reflected by the surface of the negative) is separated into three colors, i.e., red, green and blue by means of a three color separating optical element. The light of each color is measured of its density in a separate photomultiplier 2.

The outputs of the photomultiplier 2 corresponding to the respective separated colors of light are amplified by an amplifier 3 and sampled by sample hold circuit 4. The sampling action of the sample hold circuit 4 is controlled by sampling pulses fed from a scanner control circuit 5 which also controls the scanning means of the scanner 1 so that the sample is held in synchronization with the scanner 1. Therefore, the color negative is measured at a plurality of points equally spaced and arranged in order. For example in case of a negative having an image frame size of 24 mm×36 mm, 748 points (22×34) each having a diameter of 1 mm are sampled at intervals of 1 mm.

The sampled signals held by the sample hold circuit 4 are fed to a log conversion circuit 6 to be log-converted and the red, green and blue densities R, G, B of each measured point is calculated thereby. More specifically, log 1/T (T: transmissivity) is calculated.

The calculated densities R, G and B are delivered to a normalizing circuit 7 to be linear-converted depending on signals fed from a film type input means 8 which outputs different signals depending on the gamma value and sensitivity of the negative. As mentioned above, color films of different gamma values and sensitivities give different color densities even for the same subject matter photographed under the same condition. Therefore, the calculated densities are normalized by the normalizing circuit 7 so that the same values are given for the same exposure regardless of the kind of film.

The normalized values of red, green and blue densities of each measured point are inputted to a color identifying circuit 9 in which it is determined whether or not the measured point has the predetermined particular color by using the normalized values in the calculation described above.

When the color identifying circuit 9 has determined that the measured point has the particular color, the circuit 9 outputs a binary one signal. Otherwise it outputs a binary zero signal. The signal outputted from the circuit 9 together with the normalized values of red, green and blue densities of each measured point is given to an interface 15 and stored in a memory 16 at an address specified by a measuring position signal delivered from the scanner control circuit 5 to the interface 15.

The number of binary "1" output signals is counted by a counter 17 and when the number of the binary "1" signals exceeds a predetermined number, the counter 17 outputs a signal which is delivered to CPU (Central Processor Unit) 18 through the interface 15.

When the sum of the binary "1" output signals of the identifying circuit is more than the predetermined number, the counter 17 gives a command to the memory 16 to read the stored data. At this time, only the data corresponding to the points determined to have the particular color are sent to the CPU 18. The CPU 18 calculates the respective average densities of the three colors ($\overline{R}$, $\overline{G}$, $\overline{B}$) of the particular color points. The average densities $\overline{R}$, $\overline{G}$ and $\overline{B}$ are sent to the exposure control system of the color printer for controlling the exposure. Thus, the subject matter having the predetermined particular color is reproduced in a good condition.

When the sum of the measured points having the particular color is not more than a predetermined number, the color negative is printed according to the conventional LATD printing system or some other system.

When the color detecting device of the present invention is off-lined with the color printer, the data are recorded on a magnetic recording tape or perforated slip and the color printer is controlled thereby.

In the device of this invention, more than one predominant color can be detected. If it is determined that two or more of such predominant colors are included in the negative, the negative should be printed based on the color densities of one of them. What is to be considered a predominant color may be determined according to the number of the measured points the color of which is determined to have the predominant color, or may be selected according to a priority system.

Figure 3:
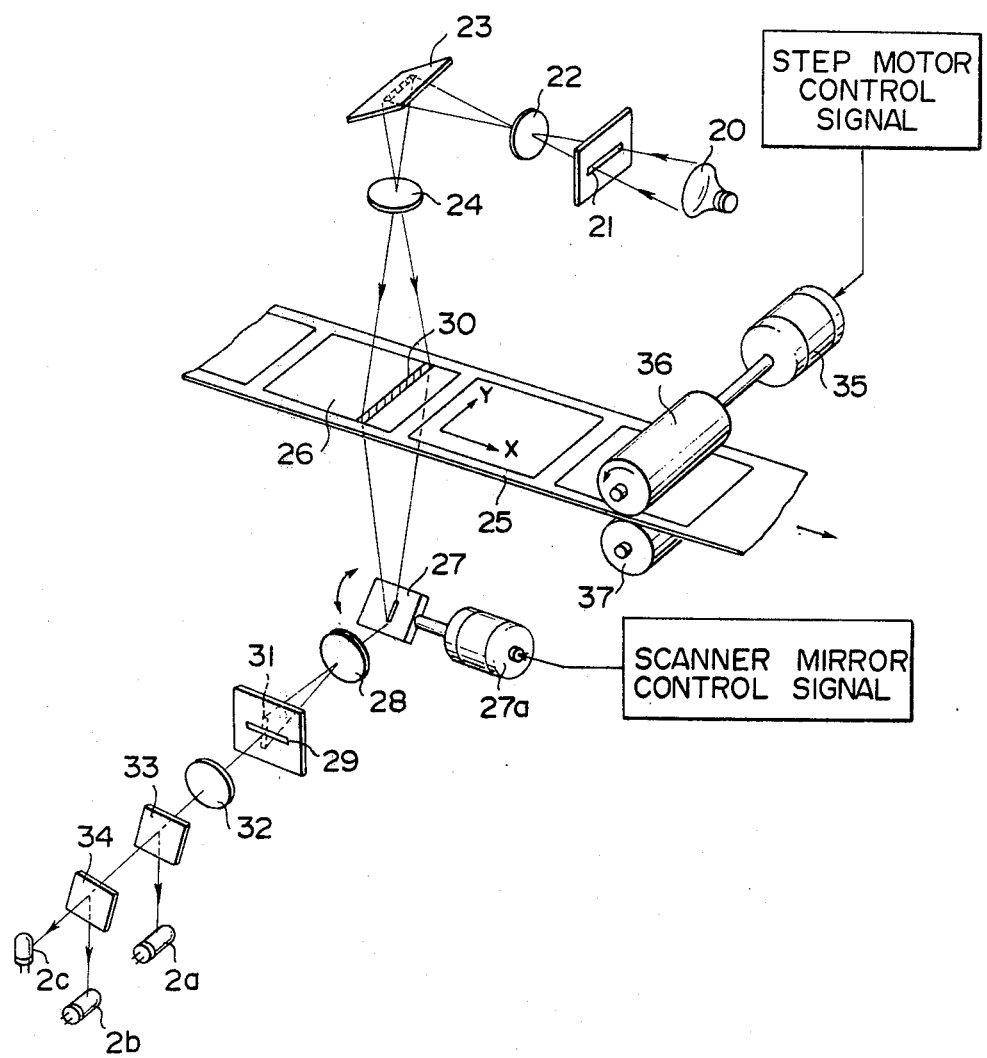
FIG. 3 is a perspective view of a scanner which can be used in the device shown in FIG. 2.

FIG. 3 shows an example of a scanner which can be used in the particular color detecting device of this invention.

In the scanner shown in FIG. 3, the illuminating light from a light source 20 is limited in width by a narrow slit 21. The thin light beam passing through the slit 21 goes through a lens 22 to impinge upon a reflective mirror 23. The light beam is then reflected downwardly by the mirror 23 to pass through another lens 24 and reaches the surface 26 of a color negative 25. The thin light beam illuminates a strip-like zone 30 of the surface 26 about 1 mm wide and extending in the transverse direction of the negative 25.

The strip-like light passing through the negative 25 is reflected by a scanner mirror 27 located below the color negative 25 to reach a slit 29 through a lens 28. The scanner mirror 27 is secured to the rotating axis of a galvanometer 27a to rotate together therewith. The galvanometer 27a is controlled by a mirror controlling signal of saw-tooth wave form given by the scanner control circuit 5 shown in FIG. 2 and rotates the mirror 27.

The image of the strip-like zone 30 of the negative 25 is projected on the slit 29 in an image 31 extending in the direction transverse to the slit 29. The projected image 31 of the zone 30 shifts in the direction transverse to the slit 29 as the scanner mirror 27 rotates. Accordingly only a part of the image 31 can pass through the slit 29, and the part of the image 31 which passes through the slit 29 is varied from one end thereof to the other as the mirror 27 rotates.

The light passing through the slit 29 travels through a lens 32 and is separated into three colors, namely red, green and blue, by means of a pair of dichroic mirrors 33 and 34. The quantity of the light beam of each of the three colors is measured by means of one of the photo-multipliers 2a, 2b and 2c.

The surface 26 of the color negative 25 is scanned in the transverse direction by means of the scanner mirror 27, while the negative 25 is scanned in the longitudinal direction by intermittently transferring the negative 25 in the longitudinal direction. The negative 25 is transferred by a pair of film feeding rollers 36 and 37. The roller 36 is driven by a step motor 35 which is controlled by the scanner control circuit 5. The step motor 35 is rotated through a predetermined angle controlled by a signal which is generated by the scanner control circuit 5 when said scanner mirror 27 returns to its starting position. When the step motor 35 rotates, the roller 36 is rotated to move the negative 25 in the longitudinal direction by a predetermined length.

Figure 4:
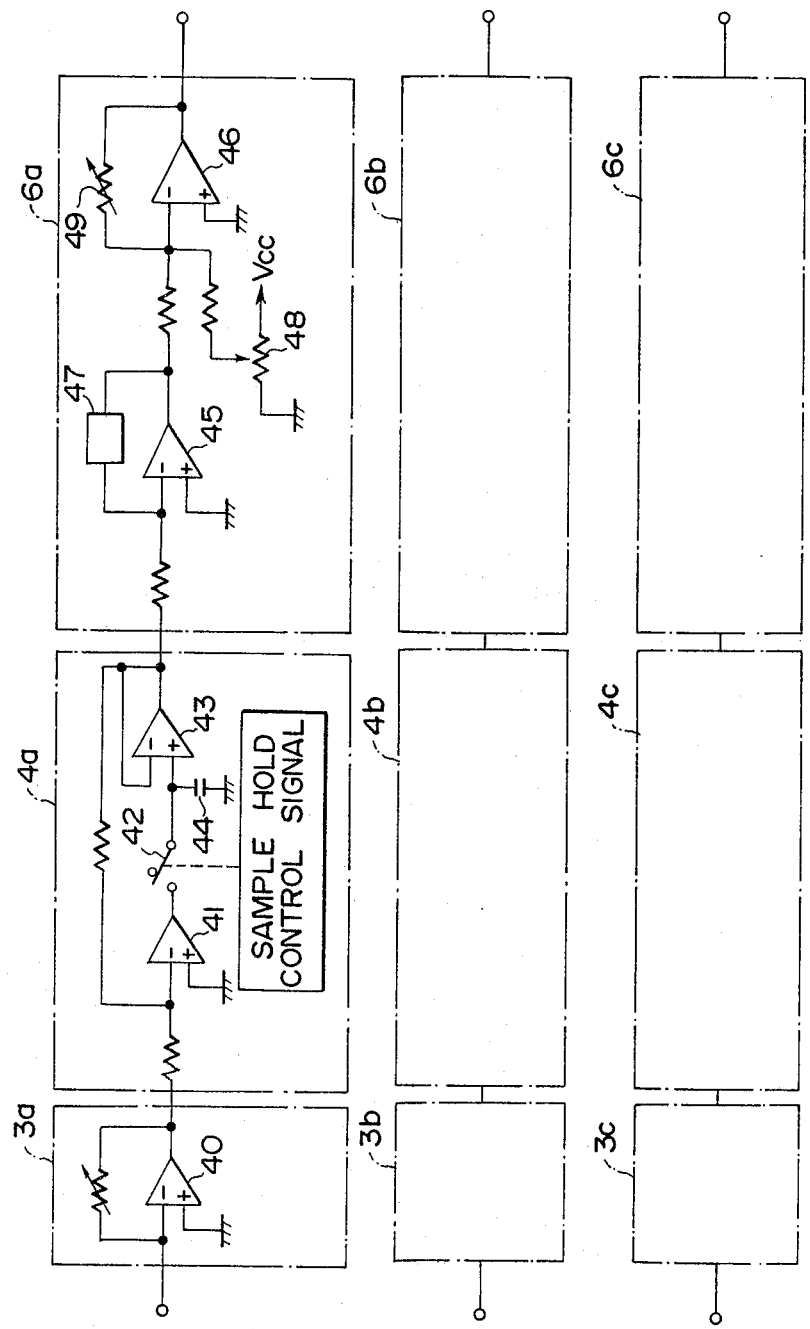
FIG. 4 is a circuit diagram of an amplifier, a sample hold circuit and a log conversion circuit which can be used in the device shown in FIG. 2.

FIG. 4 shows an example of the amplifier 3, the sample hold circuit 4 and the log conversion circuit 6.

The amplifier 3 includes three amplifiers 3a, 3b and 3c for the separated blue, green and red lights, respectively. Similarly, the sample hold circuit 4 and the log conversion circuit 6 include three sample hold circuits 4a, 4b and 4c, and three log conversion circuits 6a, 6b, 6c, respectively. Each amplifier comprises an operational amplifier 40, for example.

The outputs of the photomultipliers 2a, 2b and 2c respectively corresponding to the light quantities of blue, green and red are amplified by the respective amplifiers 3a, 3b and 3c and fed to the respective sample hold circuits 4a, 4b and 4c to be sampled.

In each sample hold circuit 4, the output terminal of a first operational amplifier 41 is connected to the non-inversion input terminal of a second operational amplifier 43 through a switch 42. To the non-inversion input terminal of the second operational amplifier 43 is connected a capacitor 44. The switch 42 is opened when the sampling control signal is generated by said sample hold control circuit 5. When the switch 42 is opened, the output signal of the first operational amplifier 41 outputted immediately before the opening of the switch 42 is stored in the capacitor 44.

The second operational amplifier 43 outputs electric current corresponding to the voltage of the capacitor 44, since the inversion input terminal and the output terminal thereof are short-circuited.

In this manner, the measured signals of the three colors for each measured point are sampled by the sample hold circuits 4a, 4b and 4c, respectively.

Each sampled signal is applied to the log conversion circuit 6 to be log-converted, where the transmission densities are calculated through the transmissivities T.

Each log conversion circuit 6a, 6b, 6c comprises an operational amplifier 45 for log conversion and operational amplifier 46 for level adjustment. To the feed-back circuit of the log conversion operational amplifier 45 is connected a log expansion element 47, for example a log diode. An example of the input-output characteristics of such a log conversion operational amplifier are shown in Table 1.

TABLE 1

| Transmissivity (T) % | Transmission Density (D) | Input (V) | Output (V) |
|---|---|---|---|
| 100 | 0 | 10 | 4 |
| 10 | 1 | 1 | 2 |
| 1 | 2 | 0.1 | 0 |
| 0.1 | 3 | 0.01 | −2 |

Since an analog computer has an output range of about ±10 V, the level is adjusted by said level adjusting operational amplifier 46 disposed in the next stage in order to effectively utilize the output range. Thus, a constant-level potential is added to the log-converted density signals by a potentiometer 48, and subsequently the adjusted log-converted density signals are amplified with a gain determined by the resistance of a feed-back resistor 49.

Figure 5:
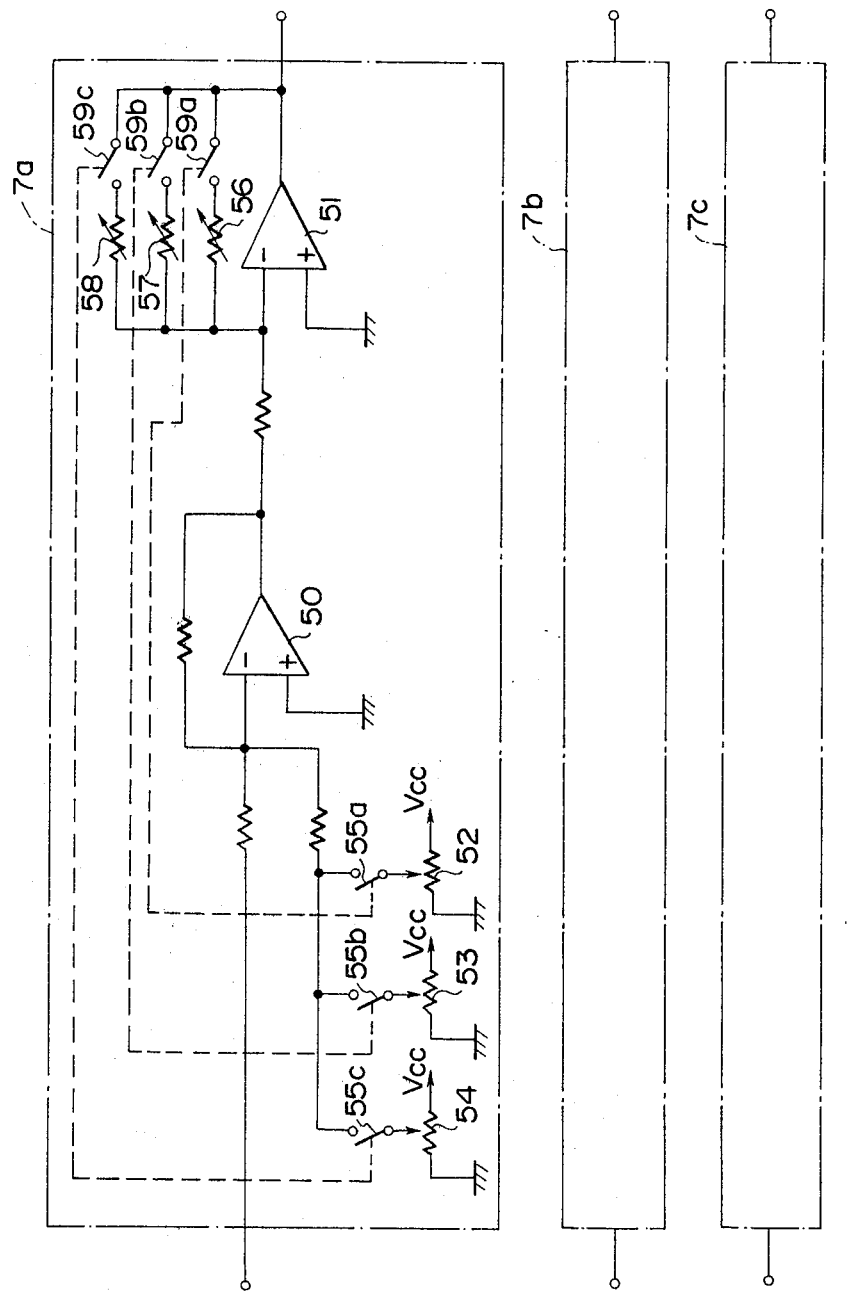
FIG. 5 is a circuit diagram of a normalizing circuit which can be used in the device shown in FIG. 2.

FIG. 5 shows an example of the normalizing circuit 7. The normalizing circuit 7 also includes three normalizing circuits 7a, 7b and 7c for the blue, green and red density signals, respectively. Each normalizing circuit comprises a pair of operational amplifiers 50 and 51 connected in series with each other. To the inversion input terminal of the first operational amplifier 50 are connected three potentiometers 52, 53 and 54 through selective switches 55a, 55b and 55c, respectively.

The potentiometers 52, 53 and 54 add constants of different predetermined values to the density signals from the log conversion circuit 6 to correct the density signals in accordance with the sensitivity of said color negative. Said three selective switches 55a, 55b and 55c are closed selectively to connect one of the potentiometers 52, 53 and 54 in accordance with the type of the negative being to be printed. Thus, in the normalizing circuit of this example, three types of negatives can be normalized. However, it is preferred that four or more selective switches and potentiometers be provided so that more types of negatives can be normalized.

The density signals corrected in accordance with the sensitivity of the negative by the first operational amplifier 50 are amplified by the second operational amplifier 51 to be corrected in accordance with the gamma value of the negative. To the feed-back circuit of the second operational amplifier 51 are connected in parallel three variable resistors 56, 57 and 58 for gain adjustment. Three selective switches 59a, 59b and 59c are connected in series respectively with the variable resistors 56, 57 and 58. Accordingly, the gain can be adjusted by at least three steps. The selective switches 59a, 59b and 59c are respectively turned on and off in response to the operation of the selective switches 55a, 55b and 55c for said potentiometers 53, 54 and 55.

FIG. 6 shows an example of a color identifying circuit which is used when the particular color is defined by a polygon in a two-dimensional coordinate system as described above and shown in FIG. 1.

In FIG. 6, the normalized green and blue densities G and B are inputted to an operational amplifier 100 which constitutes a subtractor and the difference between them, i.e., G-B, is calculated. Similarly, the difference between the normalized red and green densities i.e., R-G, is calculated by an operational amplifier 101.

As described above, in order for the measured densities to fall within the trapezoid 10 shown in FIG. 1, Y and X which respectively represent (G-B) and (R-G) should satisfy the following conditions.

$$Y \leq \tan \alpha \cdot X \quad (1)$$

$$Y \geq \tan \beta \cdot X \quad (2)$$

$$Y \geq (-\tan \gamma) \cdot X + a \quad (3)$$

$$Y \leq (-\tan \delta) \cdot X + b \quad (4)$$

The calculated (R-G) is multiplied by $\tan \alpha$, $\tan \beta$, $(-\tan \gamma)$ and $(-\tan \delta)$ by means of respective coefficient multipliers 102, 103, 104 and 105 to give $\tan \alpha \cdot X$, $\tan \beta \cdot X$, $(-\tan \gamma) \cdot X$ and $(-\tan \delta) \cdot X$. The values of $\tan \alpha \cdot X$ and $\tan \beta \cdot X$ are respectively compared with (G-B) by means of comparators 106 and 107. The values of $(-\tan \gamma) \cdot X$ and $(-\tan \delta) \cdot X$ are respectively added with "a" and "b" by potentiometers 110 and 111 to give $(-\tan \gamma) \cdot X + a$ and $(-\tan \delta) \cdot X + b$. Then, $(-\tan \gamma) \cdot X + a$ and $(-\tan \delta) \cdot X + b$ are respectively compared with (G-B) by means of comparators 108 and 109.

The comparators 106-109 respectively output binary signals of "1" when said inequalities (4)-(7) are satisfied. Otherwise, the comparators 106-109 respectively output binary signals of "0". The output of each of the comparators 106-109 is inputted to an AND circuit 112. The AND circuit 112 emits a binary output signal of "1" only when output signals of the comparators 106-109 are all "1", which represents the case where the four inequalities (4)-(7) are all satisfied.

We claim:

1. A color detecting device for determining whether or not a particular color is included in a color negative comprising a color density measuring means which measures the red, green and blue densities of a plurality of points on a color negative, a normalizing means which normalizes the measured densities to correct their values in accordance with the gamma value and sensitivity of the negative, and a color identifying means which determines whether or not the normalized color densities fall within a closed region in a color chromaticity coordinate system of two dimensional type the axes of which represent the combinations of the red, green and blue densities, said closed region defining said particular color.

2. A color detecting device as defined in claim 1 wherein said closed region is a polygon having a plurality of straight sides defined in a two dimensional coordinate system the axes of which represent the combinations of the two densities among said red, green and blue densities.

3. A color detecting device as defined in claim 2 wherein said two dimensional coordinate system is a rectangular coordinate system the X-axis and Y-axis of which represent red density minus green density (R-G) and green density minus blue density (G-B), respectively.

4. A color detecting device as defined in claim 2 wherein said color identifying means comprises at least two subtractors which operate R-G and G-B, respectively, a plurality of comparators which determine whether the points represented by R-B and G-B in the two dimensional coordinate system fall within said polygon, and an AND circuit for receiving outputs from said comparators.

5. A color detecting device as defined in claim 1 wherein said particular color in flesh color.

6. A color detecting device as defined in claim 1 wherein said particular color is sky blue.

7. A color detecting device as defined in claim 1 wherein said color density measuring means comprises a scanner for optically scanning a color negative, a color separating optical element which separates light from the color negative scanned by said scanner into red, green and blue colors of light, and three photodetectors for measuring the light of red, green and blue color from the color separating optical element.

8. A color detecting device as defined in claim 1 further comprising a counter which counts the number of the measured points which are determined to be of the particular color by said color identifying means.

9. A color detecting device as defined in claim 1 further comprising a memorizing means which memorizes a flag that represents the result of the color identification in terms of a binary code and the red, green and blue densities normalized by said normalizing means for every measured point.

* * * * *